Albert E. Youngren, INVENTOR

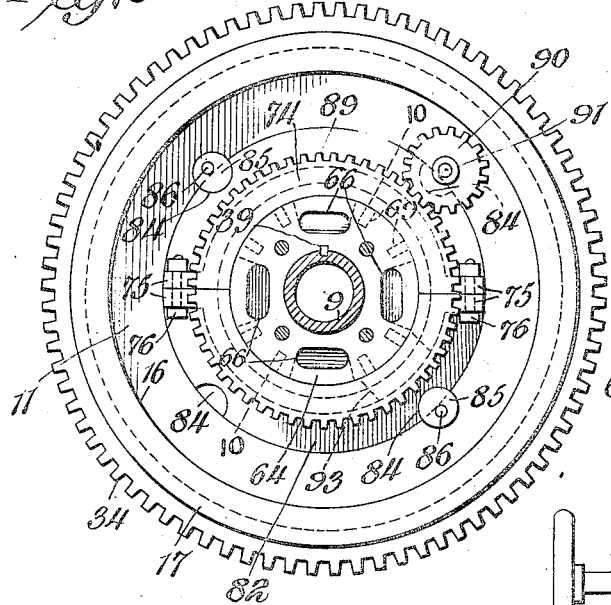
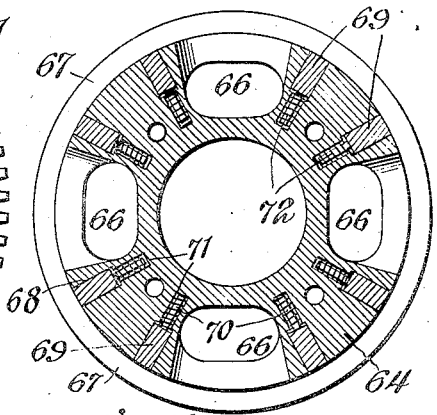
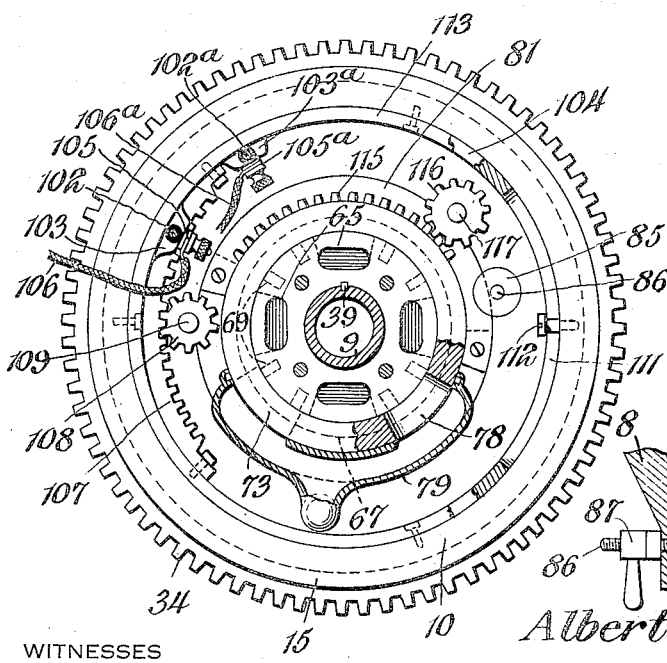
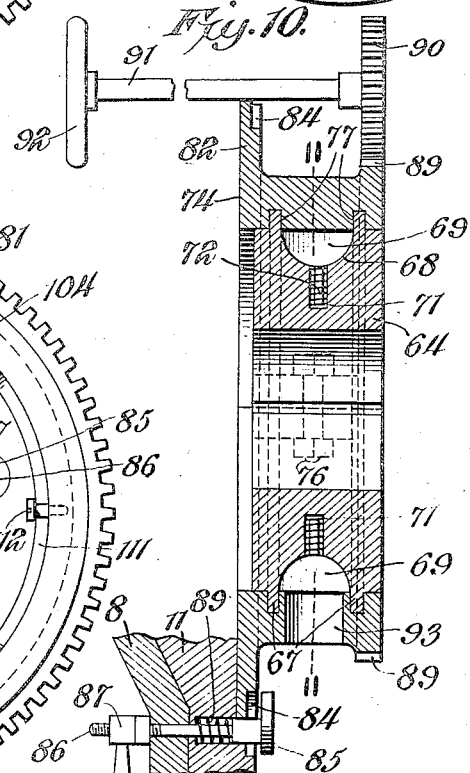

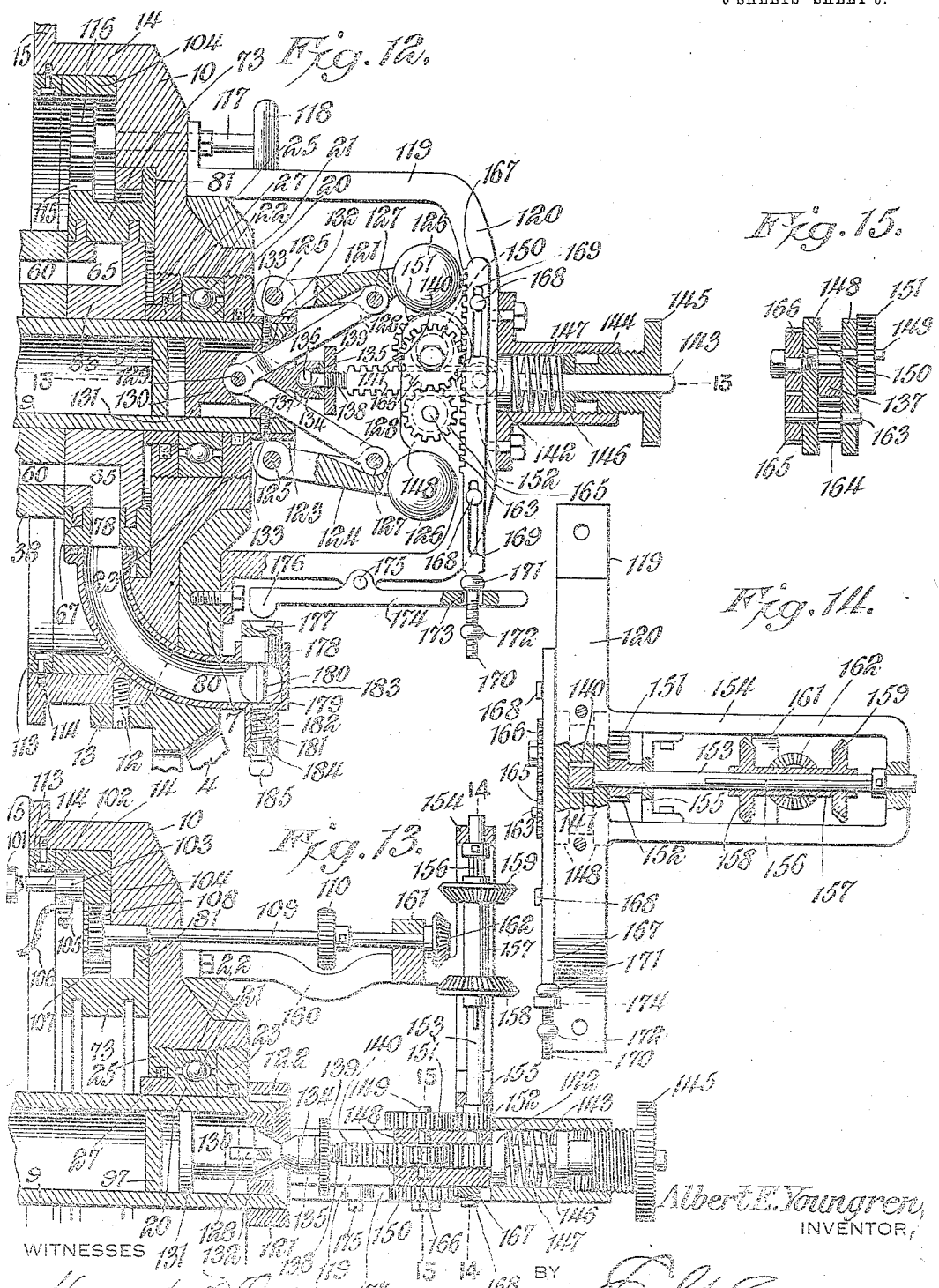

UNITED STATES PATENT OFFICE.

ALBERT E. YOUNGREN, OF KEWANEE, ILLINOIS.

INTERNAL-COMBUSTION ENGINE.

1,037,400.          Specification of Letters Patent.      Patented Sept. 3, 1912.

Application filed April 11, 1911. Serial No. 620,423.

*To all whom it may concern:*

Be it known that I, ALBERT E. YOUNGREN, a citizen of the United States, residing at Kewanee, in the county of Henry and State of Illinois, have invented a new and useful Internal-Combustion Engine, of which the following is a specification.

This invention has reference to improvements in internal combustion engines, and its object is to provide a rotary multi-cylinder engine of the four cycle type wherein valves are eliminated the same as in the two cycle type of engine. Because of the valveless structure the charge may be taken into a cylinder, compressed, ignited and burnt gases scavenged without the use of cams, rollers, webs, valves or rocker arms, or similar devices, and not only is the structure simplified, but engine troubles due to a multiplicity of parts and to the presence of valves and valve operating structures are entirely eliminated. Moreover, the weight of the engine as a whole may be reduced since the weight necessarily included in a fly-wheel in engines where the cylinders are stationary is supplied in part by the cylinders themselves, these cylinders rotating about a common axis when the engine is in operation.

The engine may be of the air cooled type, and since the cylinders rotate about a common axis the temperature of the cylinders may be kept down because of the ventilation offered by the rotation of the cylinders. Furthermore, the proper succession of the cycles may be established and will be maintained indefinitely, since such maintenance is positive and the cycles cannot get out of step one with relation to the other, but the relation of the cycles to the rotative movement either as to position or speed may be varied as may be desired and ready compensation for wear is, also, provided.

The various features of the invention will be best understood from a consideration of the following detailed description taken in connection with the accompanying drawings forming a part of this specification, with the understanding, however, that while the drawings illustrate a practical form of the invention the form shown is susceptible of various modifications without material change or effect upon the salient features of the invention.

Figure 1:
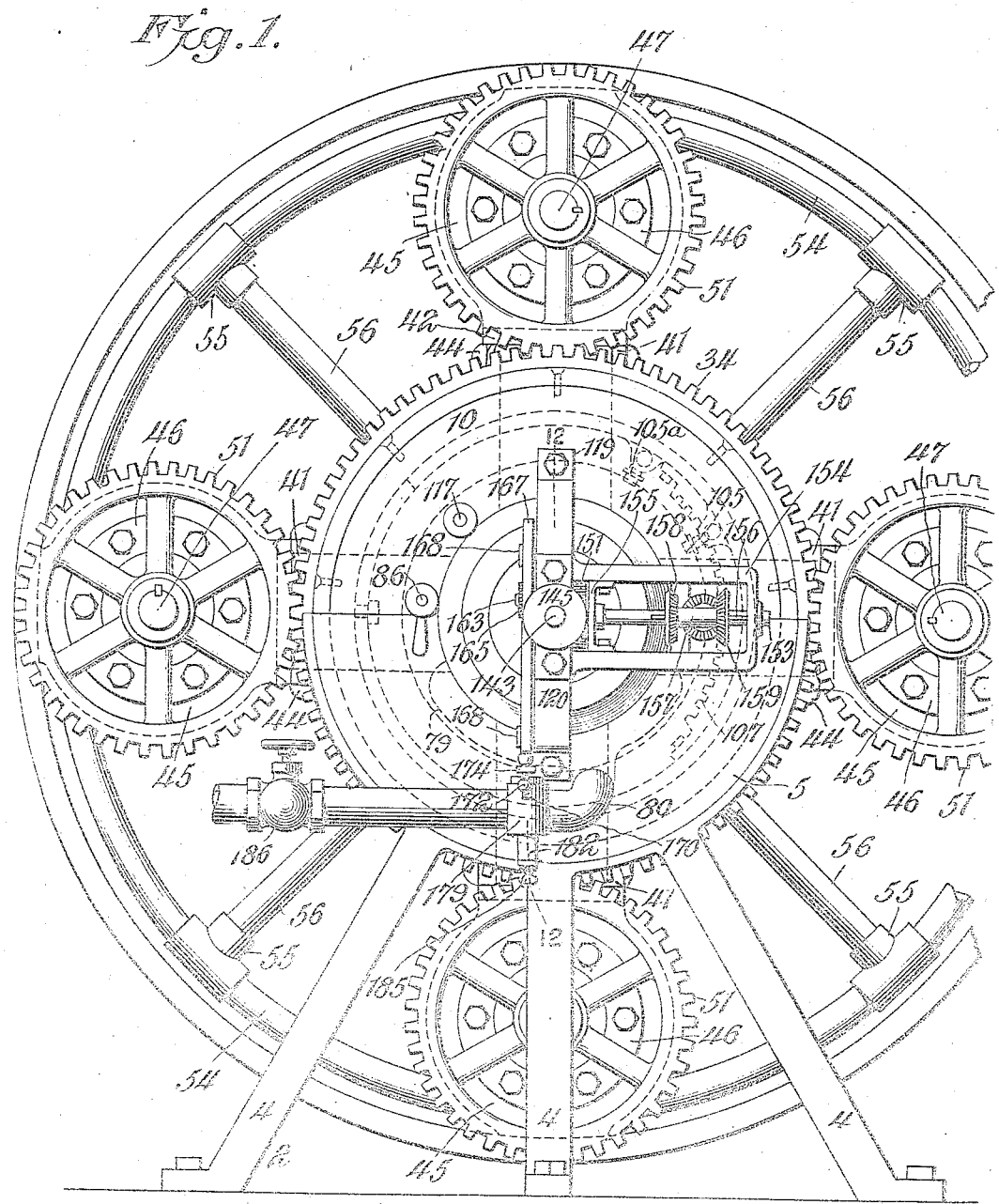
Figure 2:
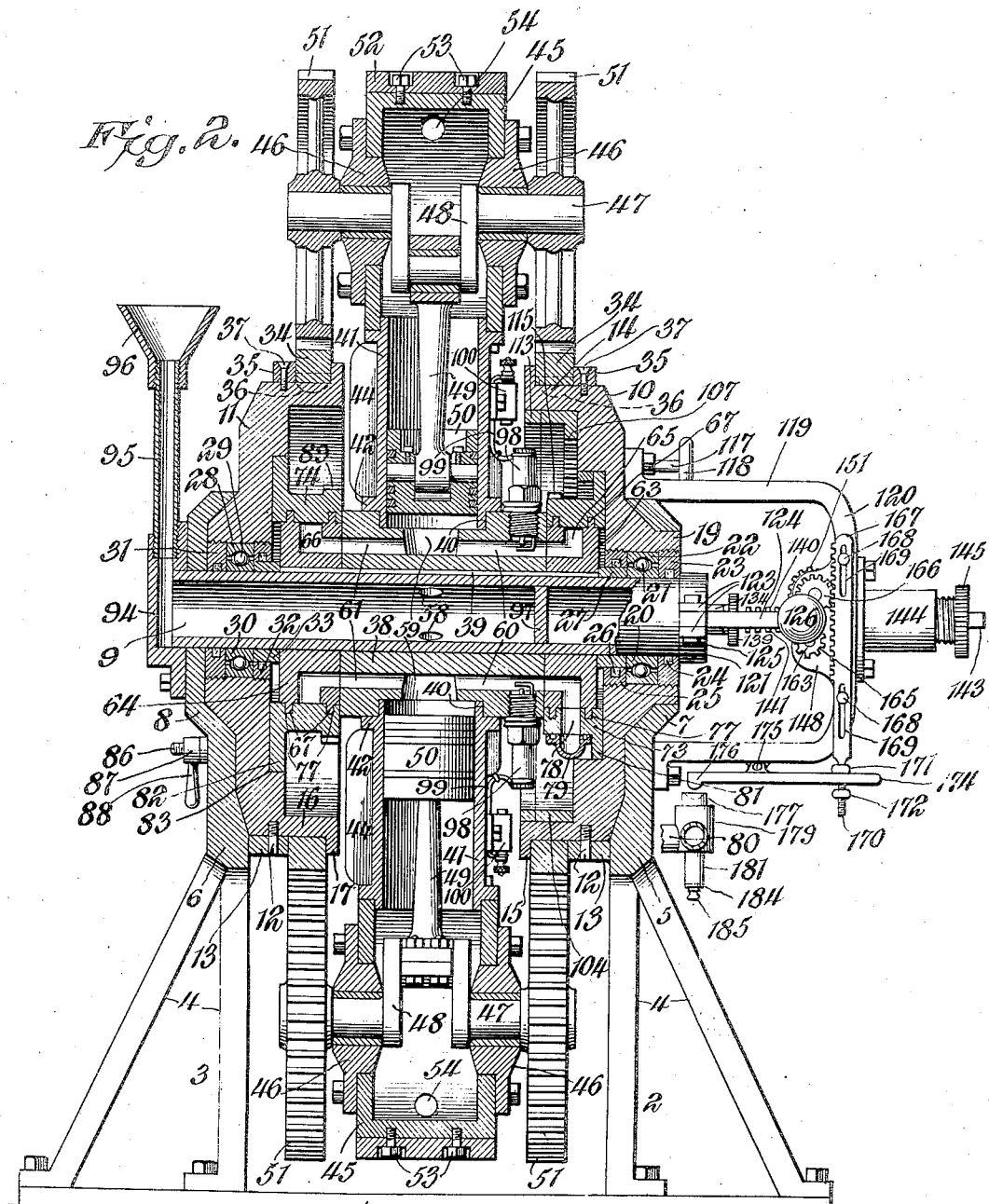
Figure 3:
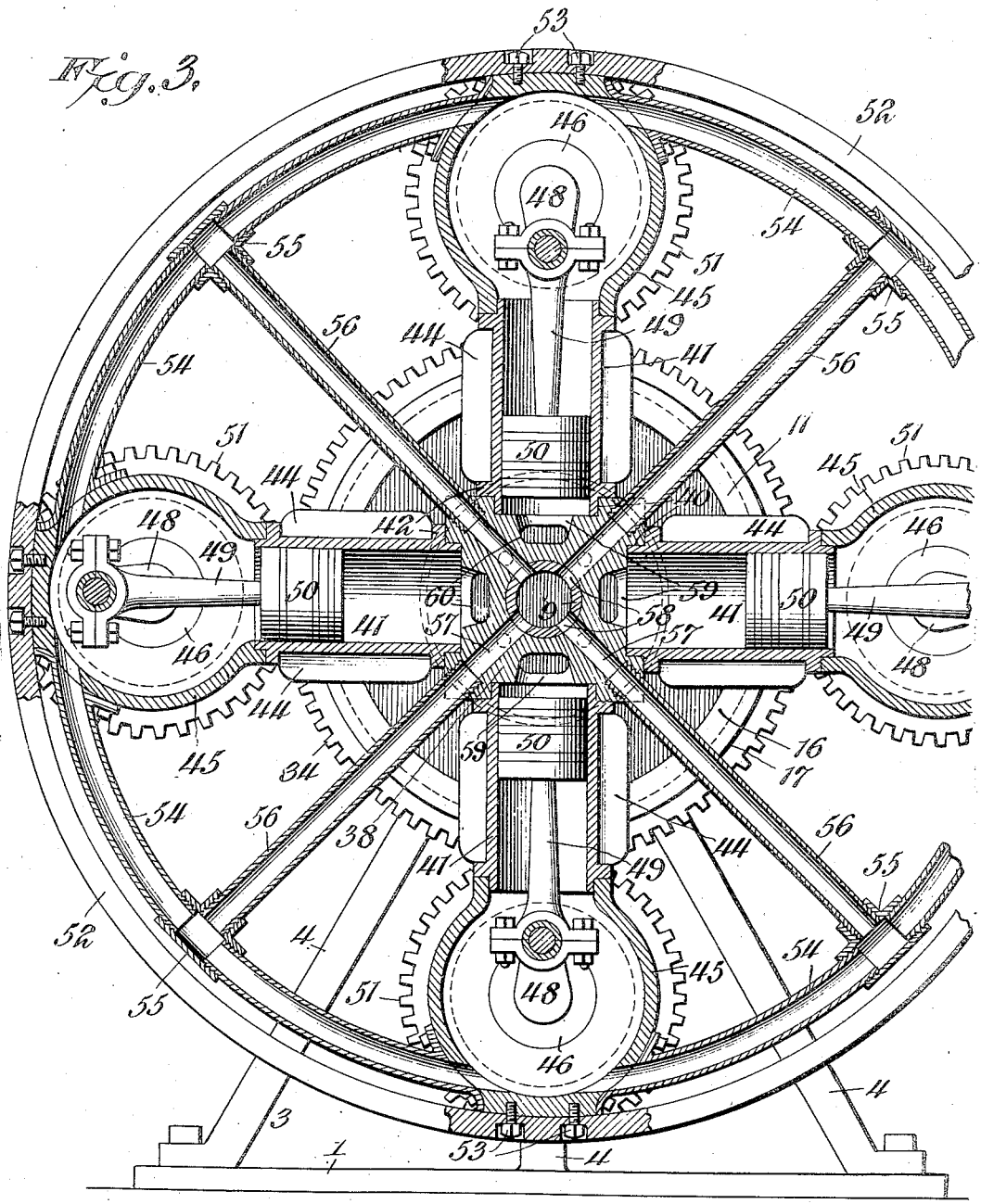
Figure 4:
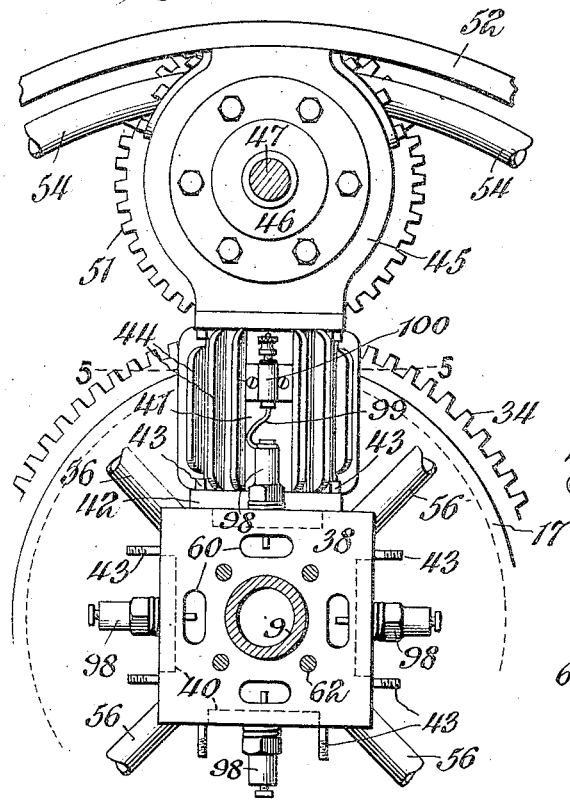
Figure 5:
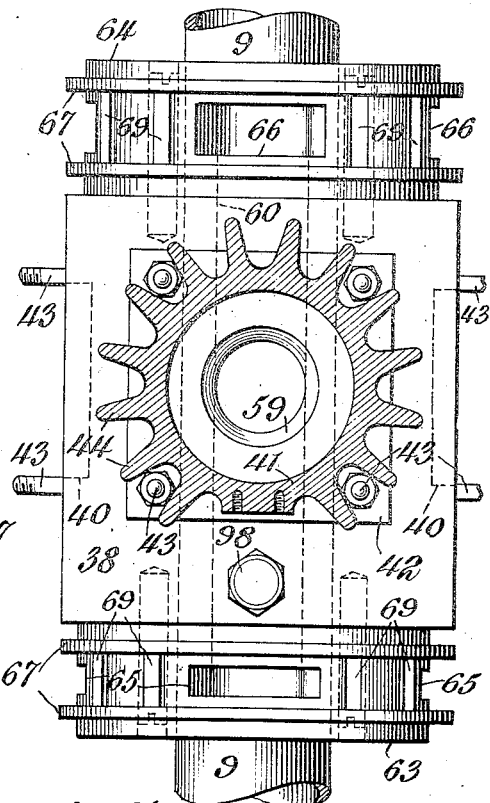
Figures 6, 7:
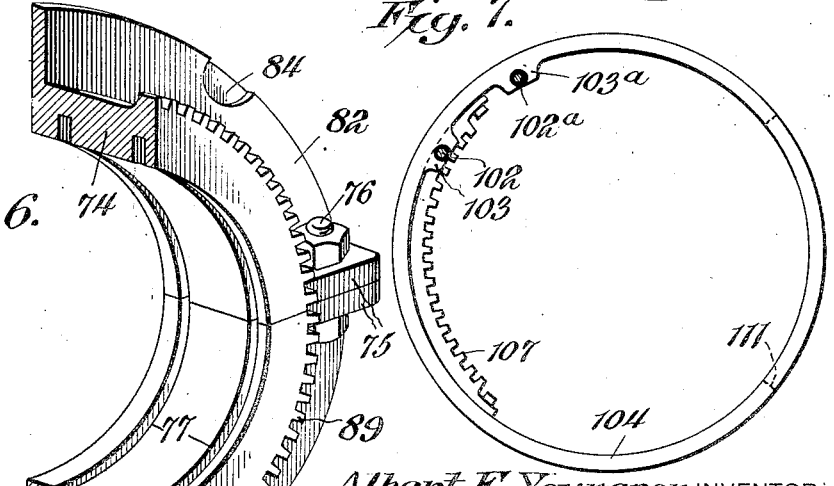

In the drawings:—Figure 1 is an elevation of the engine of the present invention as viewed from the governor side. Fig. 2 is a central vertical section along the axis of rotation with some parts shown in elevation. Fig. 3 is a central vertical section at right angles to the axis of rotation with some parts shown in elevation. Fig. 4 is a side elevation of one of the cylinders and the rotatable hub member carrying the cylinders, as well as a portion of the rim and of some other parts, the main engine shaft and the shaft individual to the cylinder being shown in cross section. Fig. 5 is a section on the line 5—5 of Fig. 4 looking toward the axis of rotation of the engine and showing some parts omitted from Fig. 4, Fig. 5 being drawn to a larger scale than Fig. 4. Fig. 6 is a perspective view with parts in section of the adjustable exhaust-port annulus. Fig. 7 is an elevation with parts in section of the timer ring. Fig. 8 is a face view of the stationary gear on the exhaust side of the engine, also showing the means for adjusting the exhaust ports, the view being taken on the line of division between the hub and the exhaust-port ring and looking from the interior toward the outside of the machine, some parts being shown in section. Fig. 9 is a view similar to Fig. 8 but taken on the timer side of the machine and showing the intake-port ring, some parts being shown in section. Fig. 10 is a section on the line 10—10 of Fig. 8 but drawn to a larger scale. Fig. 11 is a section on the line 11—11 of Fig. 10 but omitting the adjusting annular rack. Fig. 12 is a section of the governor structure drawn to a larger scale than the other figures, the section being taken on the line 12—12 of Fig. 1. Fig. 13 is a section on the line 13—13 of Fig. 12. Fig. 14 is a section on the line 14—14 of Fig. 13. Fig. 15 is a section on the line 15—15 of Fig. 13.

Referring to the drawings, there is shown a basic member 1, which may be considered as a base plate of appropriate dimensions or any other suitable support, and at suitably spaced points the base plate carries standards 2, 3, respectively, each in the particular showing of the drawings comprising legs 4 spaced apart where secured to the base plate and converging toward the other ends, but not meeting, the legs of each standard being united in a supporting member 5, 6, respectively, of approximately semi-circular form provided with a central hub 7, 8, respectively, the standards 2 and 3 with their legs 4, supporting members 5 and 6 and hubs 7 and 8 constituting the side frame members of the machine and forming supports for the rotary portions of the machine, these supporting frame structures being suitably spaced apart to accommodate the several intermediate structures as will hereinafter appear.

The hubs 7 and 8 are traversed by the ends of a hollow shaft 9 and each supporting member or head 5 and 6 with the hub formed thereon has its inner face shaped to receive a respective annulus 10 or 11, as the case may be, such annulus being secured to the respective heads 5 and 6 and by bolts 12 carrying a retaining strip 13 of substantially semi-circular form and terminating at the top edge of the respective head 5 and 6, said retaining strip being for a purpose to be described.

The annulus 10 is formed at the outer edge with an axially extending flange or ring 14, terminating at the edge remote from the body of the annulus in a radially extending peripheral flange 15, the extent of the flange 14 from the body of the annulus 10 being such that there is a space left between the flange 15 and the strip or half-ring 13 of the head 5. The annulus 11 is formed with a flange 16 like the flange 14, and the said flange 16 has thereon a flange 17 like the flange 15. The inner face of the flange 14 is turned true for the accommodation of a portion of a timer structure which will be hereinafter referred to.

The annulus at a point nearer its axis than the flange 14 is inset to form a recess and the body of the annulus 10 surrounding the eye of the annulus is formed with an axial extension 19 continued through the hub 7, which has a central passage of appropriate size for the purpose, and the extension 19 terminates flush with the outer edge of the hub 7. The eye of the annulus 10 has intermediate thereof a ring 20 forming one raceway for balls 21 confined thereto by another ring 22 interior to the ring 20 and carried by an appropriate portion of the shaft 9. The eye of the annulus 10 exterior to the ring 20 is threaded for the reception of a bushing ring 23 grooved out on its inner face to receive packing 24 and the inner end of the eye of the annulus 10 is threaded to receive a bushing ring 25 also grooved out interiorly to carry packing 26. The bushing 25 does not extend to the shaft 9 but engages a filling ring 27 carried by the shaft 9.

The annulus 11 is similar to the annulus 10 except that it does not extend through the hub 8 but carries a ring 28 having a race-way retaining balls 29 in conjunction with another ring 30 having a race-way and mounted on the appropriate portion of the shaft 9. The eye of the annulus 11 also carries packing holding bushings 31 and 32 similar to the bushings 23 and 25 and the bushing 32 is in engagement with a filling in ring 33 carried by the shaft 9 and similar to the ring 27. The several bushings with the packing rings serve as oil retainers for the anti-friction or ball bearings, and the annuli 10 and 11 constitute sub-frames in conjunction with the main frames formed of the heads 5 and 6 and the supporting standards 2 and 3. Mounted on each annulus or sub-frame 10 and 11 is a circular rack 34 confined between the half-ring 13 and flange 15 of the main frame head 5 and the sub-frame 10 and the like parts of the main frame head 6 and sub-frame 11, and these circular racks 34 are further held in place by retaining strips or half-rings 35 made fast to the respective sub-frames 10 and 11 between the ends of the half-rings 13 of the heads 5 and 6, the said half-rings 13 and 35 coacting as retaining means for holding the racks 34 against the respective flanges 15 and 17. The racks 34 are held against rotation by keys, indicated at 36; and the strips 35 are held in place by screws 37 or by other suitable means, so that these strips 35 may be removed when desirable and the keys 36 also removed when the racks 34 may be turned to different positions for a purpose which will hereinafter appear.

Mounted on the shaft 9 intermediate thereof is a hub or port-block 38 made fast to the shaft by a key 39 or in any other appropriate manner. This port block 38 is shown as substantially square in cross section, although not limited to such form, and each face of the port block is recessed, as shown at 40, for the reception of the corresponding end of a cylinder 41, which latter is provided with a flange 42 designed to engage the corresponding face of the port block and held thereto by stub bolts 43 or by any other appropriate means. In the particular showing of the drawings there are four cylinders 41 equi-distantly disposed about the port block 38 and in radial relation thereto, each cylinder having heat radiating fins 44 formed on or attached thereto after the usual practice in explosion engines with air cooled cylinders. Each cylinder at the outer end carries a crank case 45 provided on opposite sides with removable cheeks 46 in which are formed bearings for a crank shaft 47, to the crank 48 of which there is connected one end of a pitman 49, the other end of which is connected to a piston 50 of the customary trunk type within the cylinder 41. So far as each cylinder with its crank case, piston, crank shaft and pitman is concerned, the particular construction is not material to the present invention, and so needs no special description.

Each end of each cylinder shaft 47 carries a gear wheel 51 meshing with a respective one of the racks 34, so that when the piston 50 is reciprocated rotative movement is imparted to the gears 51 on each end of the crank shaft 47 and the cylinder with its crank case and the port block 37, together with the shaft 9, is rotated about the longitudinal axis of the shaft 9, since the parts carrying the racks 34 are fixed against movement. The result is that the cylinders and parts carried and controlled by them rotate when the engine is running with a speed determined by the relation of the gears 51 to the racks 34, and the speed of reciprocation of the pistons 50.

The several crank cases 45 have their outer ends connected by a rim 52 which may be a continuous structure, and made fast to the crank cases by screws 53 or in any other suitable manner, so that the crank cases are held in fixed relation one to the other by the rim and strengthened and braced thereby, while the said rim may be utilized for the application of a belt, whereby power may be transmitted to the work to be done. Of course, it is evident that the rim 52 may be otherwise constructed for the transmission of power.

The several crank cases are connected together by breather tubes 54 opening at the ends into the crank cases, and these breather tubes may be located close to the inner periphery of the rim 52. At intermediate points between the crank cases the breather tubes have T's 55 included therein, and from these T's there are branch tubes 56 extending radially to the block 38, into which latter the branch tubes 56 are screwed, and in alinement with these tubes are conduits 57 also radially disposed with relation to the block and are in matching relation at their inner ends with passages 58 opening through the shaft 9 into the interior thereof. The interior chambers of the crank cases are therefore connected one with the other through the breather tubes, and, also, with the interior of the shaft 9 through the branch tubes 56, conduits 57 and passages 58, all for a purpose which will hereinafter appear.

The block 38 has leading from each seat 40 for the end of a cylinder 41, a passage 59 connecting with passages 60 and 61, respectively, leading to and through opposite ends of the block 38, there being a passage 59 and oppositely directed passages 60 and 61 for each cylinder 41. The passage 60 in conjunction with the passage 59 constitutes the inlet port or passage for the cylinder, while the passages 59 and 61 constitute the exhaust port or passage for the cylinder, and, moreover, these passages when not serving either as the inlet or exhaust passages constitute part of the explosion chamber, wherein the charge is compressed and ignited.

Attached to the opposite ends of the block 38 by bolts 62 or otherwise are ring like members 63, 64, respectively, each substantially like the other and one of which, say the ring 64, is shown in detail in Figs. 10 and 11. The two rings constitute continuations of the block 38, the ring 63 having passages or ports 65 therein matching the passages 60 of the ring 38 and opening radially outward at the periphery of the ring 63 and the ring 64 having passages or ports 66 matching the passages 61 of the block 38 and also opening radially outward at the periphery of the ring 64. Each ring 63, 64 is provided on opposite sides of the peripheral openings of the passages 65 and 66, respectively, with flanges 67 extending radially outward from the periphery of the respective ring. Intermediate of the passages 65 and 66, respectively, the rings are provided with sockets 68, in which are lodged blocks 69 in radial relation to the respective ring, and each block is formed with a stem 70 seated in a recess 71 and there surrounded by a spring 72, which latter tends constantly to force its block 69 radially outward. The ring 63 may be termed the rotatable intake-port ring, and the ring 64 may be termed the rotatable exhaust-port ring. The ring 63 is surrounded by another ring 73, and the ring 64 is surrounded by another ring 74, each of these rings being formed of two parts and provided with appropriate meeting flanges 75 connected by bolts 76, whereby the rings 73 and 74 may be applied to the respective rings 63 and 64 with the flanges 67 seated in appropriate grooves 77 formed in the inner peripheries of the rings 73 and 74.

The ring 73 is formed with a port or passage 78 therethrough, into communication with which any one of the ports 65 may be brought, and the end of the passage 78 remote from the ring 63 is covered by a manifold 79 in communication with a conduit 80 leading through the sub-frame 10 and main frame head 5 to the exterior thereof and provided with certain mechanisms to be hereinafter described, the purpose of the conduit 80 being to conduct an explosive mixture to the passage 78 and through the ports 65 in appropriate order to the interior of the block 38 and ultimately to the cylinders 41. Leakage from the intake-port or passage 78 about the ring 63 is prevented by the flanges 67 and between the ports or passages 66 by the blocks 69.

The ring 73 is seated in the recess 18 formed in the sub-frame 10 and may be held against rotation therein by any appropriate fastening means, one form of fastening means which may be used being described hereinafter in connection with the ring 74 and the ring 73 is provided on the side seated in the recess 18 with a radial peripheral flange 81 for such purpose, said flange serving to center the ring 73 in said recess.

The ring 74 is provided with a flange 82 like the flange 81 of the ring 73, and this flange is seated in a recess 83 in the sub-frame 11 like the recess 18 in the sub-frame 10. The flange 82 is formed at appropriate points about its periphery with recesses 84 best shown in Figs. 6 and 8, and these recesses or pockets 84 are designed to receive locking heads 85 each on one end of a stem 86 mounted in and projecting through the sub-frame 11 and through the head 6 of the main frame, said stem being threaded at the outer end to receive a nut 87 provided with a manipulating handle 88, so that the stem 87 may be moved in the direction of its length against the action of a spring 89 acting on the stem 86 in a direction tending to unseat the head 85 from the particular pocket 84 in which it normally engages. While not mandatory, it is preferred to provide two heads 85 at diametrically opposite points, and four pockets 84 equi-distantly disposed about the flange 82, whereby the ring 74 may, on being released from locking engagement with the heads 85, be rotated a suitable distance in either direction to be there again secured in the new position by the heads 85, which are drawn into the pockets 84 by a suitable manipulation of the handle 88 in a direction to cause the nut 87 to screw on the threaded end of the stem 86, thus compressing the corresponding spring and drawing the head 85 into the pocket 84 then in its path.

In order to conveniently rotate the ring 74 it is provided on the edge remote from the flange 82 with a circular series of gear teeth 89 engaged by a pinion 90 on a shaft 91 carried to the exterior of the engine frame through the sub-frame 11 at an appropriate point, whereby at the will of the operator the ring 74 may be released from the locking heads 85 and then rotated by a suitable manipulation of a hand wheel 92 on the accessible end of the shaft 91 until the desired new position is reached, when the heads 85 may be again brought into locking relation to the appropriate pockets 84 in the flange 82 and the ring 74 be locked against further rotative movement.

The ring 74 is provided with an exhaust port or passage 93 through which products of combustion may escape either directly to the atmosphere or into a suitable exhaust conduit carried to a point of disposal, but such conduit is not illustrated in the drawings. The passages or ports 66 in the exhaust ring 64 are brought successively into matching relation with the port 93 in the rotative movement of the rotor of the engine.

In order that lubricant may be supplied to the pistons of the engine, one end of the hollow shaft 9, say the end projecting through the hub 8, is covered by a cap 94 made fast to the hub 8 and provided with a stand pipe 95 and a filling funnel 96, although, of course, the end of the pipe provided with a funnel 96 may be ordinarily closed by a suitable cap to prevent contamination of the lubricant by dust or dirt. When lubricant is poured into the pipe 95 it passes into the shaft 9 by gravity, but is prevented from moving entirely to the other end of the shaft by a wall or diaphragm 97 within the pipe on the side of the passages 58 remote from the cap 94. The lubricant will gravitate through those passages 58 then lowermost and find its way through the corresponding pipes 56 into the breather tubes 54, and during the running of the engine, lubricant will find its way from one crank case to the other and keep the pistons and the bearings in the crank cases and cylinders well lubricated. A general equilibrium of pressure throughout the crank cases and breather tubes is maintained by their interconnection, the air or other fluid within the crank cases being acted upon by the reciprocation of the pistons to circulate through the crank cases and breather tubes, but at no time put under any material compression or degree of super-atmospheric or sub-atmospheric pressure.

Entering each passage 60 is the sparking end of a spark plug 98 carried by the block 38, but the particular type of spark plug employed is immaterial to the present invention. Each spark plug is connected by a conductor 99 to a contact member 100 carried by the respective cylinder 41 in position to engage a contact 101 shown in Fig. 13, which contact is preferably in the form of a wheel or roller and is carried by a stem 102 projecting from a boss 103 on a ring 104 shown in Figs. 2, 7, 9, 12 and 13, and the stem 102 is connected to a binding post 105 mounted on the boss 103, which binding post is designed to receive a conductor 106 forming one branch of a suitable sparking circuit, the other branch of which may be grounded through the engine structure after the usual practice. The timer ring 104 is, also, provided with another boss 103$^a$ carrying a binding post 105$^a$ for a conductor 106$^a$, and also carrying a stem 102$^a$, which it will be understood is provided with a contact like the contact 101, although such contact is not shown in the drawings.

The inner periphery of the ring 104 carries a gear segment 107 engaged by a pinion 108 on a shaft 109, to which reference will hereinafter be made in connection with the description of the governor mechanism, but it may here be stated that the shaft 109 carries a hand wheel 110, by means of which the shaft 109 may be rotated by hand at will in order to adjust the timer ring for the usual purpose of advancing or retarding the spark.

The ring 104 is provided with an elongated slot 111 traversed by a headed screw 112 carried by the sub-frame flange 14, the ring 104 being seated against the inner face of the flange 14 and held in place by a retaining ring 113 secured to the same flange 14 by screws 114, so that the timer ring may be removed when necessary for any purpose.
The ring 73 is adjustable circumferentially and for this purpose is provided on that side of its periphery remote from the flange 81 with gear teeth 115 in mesh with which is a pinion 116 carried by a shaft 117 journaled in and extending through an appropriate portion of the sub-frame 10 to the exterior thereof where it carries a hand wheel 118 accessible to an operator for manipulating the shaft and by it turning the pinion 116 in one direction or the other to impart rotative movement to the ring 73 to the desired extent. The pinion 116, shaft 117 and hand wheel 118 are like the gear wheel 90, shaft 91 and hand wheel 92 for the manipulation of the ring 74.

Before describing the governor structure, the operation of the engine as so far described will be set forth.

When the engine is set up, and more especially when proportioned substantially as shown, that is, with the circular gears 34 provided with double the number of teeth that are provided on the gear wheels 51, whereby each gear wheel 51 will make two complete revolutions on each complete revolution of the rotor of the engine, care is taken that the reciprocatory movements of the pistons with relation to the position of the inlet and exhaust ports of the rings 73 and 74 shall be such that when a cylinder moves into communication with the inlet port through the respective passages 59, 60 and 65, such piston shall be on the forward stroke, beginning the forward stroke as the passage or port 65 first opens to the inlet port 78 and completing such forward stroke as, or immediately after the passage or port 65 leaves the inlet port 78, so that the cylinder becomes filled by suction with an explosive charge. This action under the proportions assumed will consume one-quarter of a revolution of the rotor. During the next quarter revolution of the rotor the piston under consideration is caused to make the return or compression stroke, so that the charge is put under compression ready for firing. The next or third quarter revolution of the rotor defines the power stroke of the piston, the relation of the parts being such that the piston is now moving toward the outer end of the particular cylinder considered under the impulse of the expansion of the burning gases. On the completion of the third quarter revolution of the rotor the piston begins its return stroke, this being caused by the progressive movement of the rotor and the engagement of the gear wheels 51 with the gears 34, and as this return stroke during the fourth quarter of the revolution of the rotor begins the passages 61 and 66 connected to the passage 59 communicating with the cylinder under consideration are brought into coincidence with the exhaust port 93 in the ring 74, the passages and ports remaining in communication during practically the entire return stroke of the piston, which becomes the scavenging stroke forcing out the burned gases. Immediately after the scavenging stroke is completed the exhaust port in the ring 74 and the exhaust port 66 in the ring 64 are moved out of engagement, while the inlet port 65 in the ring 63 on the other side of the rotor moves into communication with the inlet port 78, so that the forward stroke of the piston immediately succeeding the scavenging stroke acts to draw in another fresh charge, and so the cycle of operations continues as in the ordinary four cycle explosion engine. It will be observed, however, that no valves are provided and consequently the various mechanisms necessary in four cycle engines for the operation of such valves is entirely obviated.

In the particular structure shown in Fig. 3 the piston of the lowermost cylinder may be considered as about to begin the forward or suction stroke for the charge with the rotor as a whole moving clockwise, the particular piston and its cylinder under consideration being in the six o'clock position. On the movement of the cylinder with the rotor from the six o'clock position to the nine o'clock position the piston is moving forwardly, and consequently the zone of movement included between these positions may be considered as the intake zone. During the movement from the nine o'clock position to the twelve o'clock position the piston is moving toward the axis of rotation, and since the ports are all closed, the charge within the cylinder is being compressed, so that the zone included between the nine o'clock position and the twelve o'clock position may be considered as the compression zone. If the charge be fired at the point of greatest compression, then the gases are burning during the movement of the cylinder from the twelve o'clock position to the three o'clock position, and this may be considered generally as the firing zone, although in practice by the advancing or retarding of the spark the firing of the charge may take place either slightly prior to the arrival of the cylinder at the twelve o'clock position or slightly after having passed such position, so that the firing zone is not an absolutely fixed zone, but may encroach some on the compression zone, or may not begin until after the compression zone has been passed and the piston begins again its forward movement. The zone included between the three o'clock and six o'clock positions comprises the exhaust zone when the burned gases are forced out of the particular cylinder being considered. Of course, the same cycle of operations takes place in each cylinder, but in succession, and only when the particular cylinders arrive at the particular zones mentioned, considering the parts as related substantially as shown in Fig. 3. It follows, therefore, that in each complete revolution of the rotor each piston makes one power stroke and, therefore, there are four power strokes in an engine having four cylinders, but the power strokes all take place in the same zone and consequently the wear upon the gears 34 is greatest at this zone, since the strain borne by the gears through this zone is far in excess of the forces necessary to drive the pistons during the exhaust, intake and compression operations. Ultimately, therefore, the gears 34 become worn in the zone comprised between the twelve o'clock and three o'clock positions, wherefore it is advisable to shift the gears 34, which is readily accomplished by removing the strips 13 and 35 and the keys 36, when the gears 34 may be moved axially along the periphery of the respective sub-frames 10 and 11 out of engagement with the gears 51, and then turned until unworn teeth are brought into the firing zone, after which these gears 34 may be returned to their former position against the flanges 15 and 17, respectively, and the half rings 13 and 35 again fastened in place. Since this operation has not changed the proper relation of the gear wheels 51 to each other and to the gear 34, there has been no change in the phase relation of the several pistons, and consequently no other adjustments are needed. Under these conditions the gears 51 where reaching the power zone engage an unworn set of teeth of the gears 34 and the engine will run as though new gears 34 had been installed. By this means the life of the engine so far as the gears 34 are concerned is much prolonged.

It is to be observed that by making the block 38 and the end members or rings 63 and 64 separately and afterward uniting them, the several passages through these blocks may be readily bored out, thus saving coring and permitting the production of a smoother job than is possible with coring. The construction of the engine is also facilitated by having the rings 63 and 64 made separately from the block 38, since these rings must be turned true to make practically gas tight connections with the rings 73 and 74, respectively. Of course, packing is used wherever necessary, but as this is an ordinary expedient in explosion engine practice, the showing of packing, as, for instance, between the block 38 and the rings 63 and 64, has been omitted. The key 39 is extended sufficiently to include the rings 63 and 64, which are appropriately grooved to receive the key, so that the bolts 62 are relieved from strain.

For purposes of regulation of speed under varying conditions of load, a governor is necessary, and for this purpose the governor shown in Figs. 1 and 12 to 15 is employed, the governor being so arranged as to control not only the fuel supply, but, also, the spark timer, whereby the most efficient conditions of running may be maintained. Secured to the head 5 and sub-frame 10 is a bracket 119 in the general form of a yoke and having its connecting portion 120 traversing the line of the axis of rotation of the rotor of the engine if such axis be considered as prolonged on the intake side of the engine. The shaft 9 is extended beyond the sub-frame 10, where the latter passes through the hub 7, and on the extended portion of the shaft 9 there is secured a collar 121 by a key 122, and on this collar there are formed pairs of ears 123 at diametrically opposite points of the collar and between each pair of ears there is pivotally secured one end of an arm 124 by a suitable pivot pin 125, the other end of the arm carrying a weight 126, such as is commonly employed in connection with centrifugal governors. Each arm 124 has near the weighted end a pair of ears carrying a pivot pin 127 by means of which one end of a link 128 is secured to the respective arm 124. The other ends of the links 128 are united by a common pivot pin 129 carried by a block 130 formed at one end with a head 131 fitting the interior of the shaft 9 and adapted to slide therealong to and from the division wall or web 97. The block is guided in the sliding movement by a ring 132 within the hollow shaft 9 near the corresponding outer end, this ring being held in place by screws 133 extending through the walls of the shaft and into the ring. The end of the block 130 remote from the head 131 is formed with a socket 134 normally closed by a screw bushing 135 confining a ball end 136 of a stem 137 extending through the bushing and exterior thereto provided with screw threads 138 for the reception of a nut 139. The stem 137 is continued beyond the screw threads 138 and is there widened and formed on opposite sides with gear teeth forming racks 140 and 141, respectively. The rack portion of the stem 137 passes through the connecting member 120 intermediate of the length of the latter, and beyond this connecting member 120 the stem is formed with a head 142 and beyond this head the stem is further formed with an extension 143. Secured to the connecting member 120 is a guide 144 shown as in the form of a cylinder, and the end of the guide remote from the member 120 is open ended and interiorly threaded for the reception of a thumb screw 145 having threads adapted to the threaded end of the guide and an axial bore for the passage of the stem 143. Surrounding the stem 143 between the head 142 and a washer 146 movable along the stem 143 and engaged by the thumb screw 145 is a spring 147 resistant to movement of the stem 137 with its rack teeth 140 and 141 under the impulse of the governor balls 126, and the degree of resistance of this spring is readily adjustable by the thumb screw 145.

The connecting member 120 is formed on opposite sides of the passage for the stem 137 with cheek plate extensions 148 between which the rack bar portion of the stem 137 is movable. Journaled in these cheek plates is a short shaft 149 carrying between the cheek plates a pinion 150 in mesh with the rack teeth 140, and exterior to one of the cheek plates this shaft carries a gear wheel 151 which in turn is in mesh with a pinion 152 on a shaft 153 journaled in a frame 154 extending from the connecting member 120 in a direction perpendicular thereto, this frame also carrying in parallel relation to the member 120 a bearing strip 155 to which the shaft 153 extends, this bearing strip serving to hold the pinion 152 against movement lengthwise of said shaft.

Near the end of the shaft 153 remote from the pinion 152 is an elongated spline 156, and on this portion of the shaft there is mounted an elongated hub 157 held against rotation on the shaft by the spline 156 but capable of moving in the direction of the longitudinal axis of the shaft. This hub is formed near its opposite ends with respective bevel gear wheels 158 and 159.

The frame 154 is formed with a lateral extension 160 in parallel relation to the frame 119 and at the end remote from the frame 154 connected to the sub-frame 14. This frame 160 is formed with a journal bearing 161 for one end of the shaft 109 and such end of the shaft carries a bevel pinion 162 into mesh with which either bevel gear 158 or 159 may be caused to mesh on being moved in the proper direction along the shaft 153.

The cheek plates 148 also carry a short shaft 163 on which is mounted a pinion 164 between the cheek plates and in mesh with the rack 141, while exterior to the cheek plates on the side thereof remote from the gear wheel 151 is a pinion 165 in mesh with an idler pinion 166, and this last named pinion engages a rack bar 167 mounted on one side of the connecting member 120 by means of headed pins 168 extending through slots 169 in the rack bar and carried by the connecting member 120. The rack bar 167 is of a length to extend beyond one side of the frame 119 where it is formed with a threaded stem 170, to which are applied nuts 171, 172 respectively, and this threaded stem between the nuts extends through a passage 173 in a lever 174 having a pivot support 175 on the corresponding end member of the frame 119, and the end of the lever 174 remote from that traversed by the stem 170 is formed into a rounded head 176 in position to engage a rounded socket 177 in a valve block 178 movable in a valve casing 179 interposed in the conduit 80. The valve block 178 is provided with a guiding stem 180 movable through a guide 181 within which it is surrounded by a spring 182 abutting at one end against a collar 183 on the stem and at the other end against a bushing 184 in the end of the guide 181. A knob 185 at the end of the stem 180 remote from the block 179 and exterior to the bushing 184 limits the movement of the block 178 under the action of the spring 182. Beyond the valve casing 179 the conduit 180 may be continued to a suitable source of fuel supply and may also include a valve 186 by means of which the fuel supply may be manually controlled.

Let it be assumed that the engine is at rest and that the governor structure is in the position shown in Fig. 12. Under these conditions the spark timer is in position best adapted to start the engine and the conduit 80 is open to the full extent for the admission of fuel to the engine. When the engine starts and begins to gain speed the rotative movement imparted by the shaft 9 to the governor balls 126 tends to cause these balls to move apart in the manner of a centrifugal governor, but this movement is resisted by the spring 147, and until the resistance of the spring is overcome the governor balls remain in the same position with relation to other parts that they had when the engine was at rest. Ultimately, however, the engine gains sufficient speed under the conditions of fuel supply, because the centrifugal force acting on the governor balls overcomes the resistance of the spring 147 and the governor balls will then move away from the axis of rotation and through the links 128 cause an axial movement of the block 130 and of the stem 137. While the block 130 rotates, the stem 137 does not participate in this rotation, being held against rotation by the connecting member 120, the rack portion of the stem and the passage through the connecting member 120 being of non-circular contour. This is immaterial, however, since the stem 137 has a swivel connection with the block 130. The axial movement of the stem 137 causes a rotative movement of the shaft 163 which is imparted by the pinion 165 to the pinion 166 and by the latter to the rack bar 167, the direction of movement being such as to carry the adjusting nut 171 away from the lever 174 and the adjusting nut 172 toward said lever, and this movement may continue until ultimately the end 176 of the lever 174 is brought into engagement with the valve block 178 and the latter is moved to a commensurate extent on the continued movement of the stem 137 into throttling relation to the conduit 80, thus cutting off the fuel supply as the speed of the engine increases, and ultimately the speed of the engine and the fuel supply will come into balance, so that the speed of the engine will be assured and will be maintained practically constant under ordinary variations of load within the limits of good engine practice. It will be observed that the governor is not active to throttle the fuel supply until it approaches full speed, because of the lost motion between the lever 174 and the actuating nut 172, and also the lost motion between the head 176 and the valve block 178, so that the engine may approach full speed quickly under full fuel supply before being subjected to the action of the governor. It will be further observed that the governor is operative to act on the fuel supply irrespective of the direction of rotation of the engine. The governor will also act upon the timer mechanism, but this action must be in the proper direction in agreement with the direction of speed of the engine. For this reason the two bevel gears 158 and 159 are provided and either may be moved into engagement with the bevel pinion 162 in accordance with the direction of rotative movement of the engine, the proper adjustment being made before the engine is started. As the engine increases in speed, motion is conveyed from the rack 140 to the pinion 150, thence to the gear wheel 151 and by the latter to the pinion 152, which will cause the rotation of the shaft 153, and by the proper bevel gear 158 or 159 to the pinion 162, thus rotating the shaft 109 and moving the timer ring 104 to a commensurate extent in the proper direction, thereby adjusting the time of the production of the spark in proper time relation to the movement of the piston on the compression stroke to obtain most efficient results.

It is evident that while four cylinders are shown in the drawings, a greater or a lesser number of cylinders may be used, and it is also evident that while each piston is given two complete reciprocations during one rotative movement of the rotor, such reciprocations may be made greater or lesser in number than the particular arrangement shown in the drawings, since such changes do not effect the invention and only require changes in the proportions of the parts.

There is shown and described herein a governor structure, but no claim is herein made to this governor structure *per se*, since this structure is to constitute the subject-matter of another application wherein such claims will be made.

What is claimed is:—

1. An explosion engine of the rotary type provided with a circular series of power cylinders, a support common to all the cylinders and provided with intake and exhaust passages for each cylinder and leading to opposite ends of the common support, and separate port controlling means at the intake and exhaust ends of the common support, the port controlling means on the intake side being common to all the intake passages and the port controlling means on the exhaust side being common to all the exhaust passages, the port controlling means being brought into coincidence with the respective passages in succession by the rotative movement of the rotor of the engine.

2. An explosion engine of the rotary type comprising a rotatable circular series of power cylinders, a supporting member for the cylinders common to all the cylinders and provided with passages individual to the cylinders and in constant communication therewith and leading to opposite ends of the supporting member, and separate means controlling the opposite ends of the respective passages leading to each cylinder for supplying fuel and permitting the escape of burned gases, said means being in relatively fixed relation to the cylinder support, and the latter being movable by the rotative movement of the series of cylinders to bring said cylinders in succession into communication with the intake and exhaust means.

3. An explosion engine of the rotatable type provided with a plurality of power cylinders, a rotatable port member participating in the rotatable movement of the cylinders and provided with ports individual to the cylinders and opening at opposite ends of the rotatable port member, and relatively fixed separate port members constituting respectively intake and exhaust port members, each cylinder having its port members movable by the rotative movement of the cylinder into four cycle relation to the intake and exhaust port members.

4. An explosion engine comprising a rotatable series of radially disposed power cylinders, a supporting port block for the cylinders participating in the rotative movement of the cylinders and provided with passages leading to opposite ends of the supporting port block and constituting intake and exhaust ports individual to each cylinder, and separate intake and exhaust port means at the respective opposite ends of the supporting port block relatively fixed with respect to the rotatable port block, the ports in said rotatable port block being movable by rotation of said port block into communication with the ports of the relatively fixed port members in four cycle order.

5. An explosion engine comprising a rotatable series of radially disposed power cylinders, a supporting port block for the cylinders participating in the rotative movement of the cylinders and provided with passages leading to opposite ends of the supporting block and constituting intake and exhaust ports individual to each cylinder, intake and exhaust port means at the respective opposite ends of the supporting block and relatively fixed with respect to the rotatable port block, the ports in said rotatable port block being movable by the rotation of said port block into communication with the ports of the relatively fixed port members in four cycle order, igniting means for each cylinder, and means for rendering the igniting means active by the movement of the cylinder to a predetermined portion of the rotative movement of the respective cylinder.

6. An explosion engine comprising a rotatable series of radially disposed power cylinders, a supporting port block for the cylinders participating in the rotative movement of the cylinders and provided with passages leading to opposite ends of the supporting port block constituting intake and exhaust ports individual to each cylinder, intake and exhaust port means at the respective opposite ends of the supporting port block and relatively fixed with respect to the rotatable port block, the ports in said rotatable port block being movable by the rotation of said port block into communication with the ports of the relatively fixed port members in four cycle order, igniting means for each cylinder, and means for rendering the igniting means active by the movement of the cylinder to a predetermined portion of the rotative movement of the respective cylinder, said last named means being provided with means for changing its position with relation to the rotative movement of the cylinders to retard or advance the ignition point with respect to such rotative movement.

7. An explosion engine provided with a circular series of radially disposed power cylinders with pistons therein, a port block carrying said cylinders provided with passages communicating with the interior of the cylinders, said port block having circular terminal portions, separate port members each provided with a passage, one member with its port constituting the intake side of the engine and the other member with its port constituting the exhaust side of the engine, and means for causing the reciprocatory movement of the pistons to impart rotative movement to the cylinders and the port block carrying the cylinders to bring the passages of the cylinders in four cycle order into coincidence with the intake and exhaust ports of the engine.

8. An explosion engine provided with a circular series of radially disposed power cylinders with pistons therein, a port block carrying said cylinders provided with passages communicating with the interior of the cylinders, said port block having circular terminal portions, separate port members each provided with a passage, one member with its port constituting the intake side of the engine and the other member with its port constituting the exhaust side of the engine, and means for causing the reciprocatory movement of the pistons to impart rotative movement to the cylinders and the port block carrying the cylinders to bring the passages of the cylinders in four cycle order into coincidence with the intake and exhaust ports of the engine, the port members being movable at will to vary their relation to the port block to cause rotative movement of the rotor of the engine in either direction.

9. An explosion engine provided with a circular series of radially disposed power cylinders with pistons therein, a port block carrying said cylinders provided with passages communicating with the interior of the cylinders, said port block having circular terminal portions, separate port members each provided with a passage, one member with its port constituting the intake side of the engine and the other member with its port constituting the exhaust side of the engine, and means for causing the reciprocatory movement of the pistons to impart rotative movement to the cylinders and the port block carrying the cylinders to bring the passages of the cylinders in four cycle order into coincidence with the intake and exhaust ports of the engine, said last named means comprising relatively fixed circular racks and gear wheels engaging said racks actuated by and actuating the pistons.

10. An explosion engine of the rotary type provided with a rotatable series of power cylinders each with a piston therein, a gear wheel carried by each cylinder and connected to the piston, a relatively fixed circular rack engaged by the gear wheel of each piston for causing rotative movement of the series of cylinders by the reciprocation of the pistons, and removable means for holding the circular rack in position whereby the rack may be shifted axially and rotated with relation to the gear wheels and cylinders.

11. An explosion engine of the rotary type comprising a rotatable series of power cylinders each with a piston therein and each power cylinder carrying a crank shaft connected to the piston and gear wheels on said crank shaft, circular racks for engagement with the gear wheels, fixed supports for said racks on which they may be moved axially and rotatively, and means for locking the racks to the fixed supports therefor in different positions of rotative adjustment.

12. In an explosion engine, a fixed portion, a rotor mounted thereon and comprising a circular series of radially disposed power cylinders each with a piston therein and carrying a closed crank case at the outer end with a crank shaft mounted therein and connected with the piston, gear connections between each crank shaft and the fixed portion of the engine for causing rotative movement of the rotor by reciprocatory movements of the pistons, a peripheral band connecting the outer ends of the crank cases and constituting a power transmitting member for the engine, and means for connecting the interiors of the crank cases together.

13. An explosion engine having a fixed portion, a rotor mounted thereon and comprising a circular series of radially disposed power cylinders each with a piston therein and carrying a crank case at the outer end, a crank shaft mounted in each crank case and connected to the respective piston, gear connections between each crank shaft and a fixed portion of the engine for causing rotative movement of the rotor by reciprocatory movement of the pistons, a peripheral band connecting the outer ends of the crank cases and constituting a power transmitting member for the engine, and conduits interconnecting the crank cases and constituting breather tubes therefor.

14. An explosion engine having a fixed portion, a rotor mounted thereon and comprising a port block, a plurality of power cylinders carried by said block in radial relation thereto, intake and outlets ports mounted on the fixed part of the engine and placed in communication with the power cylinders in four cycle order by the rotative movement of the port block and cylinders carried thereby, crank cases carried by the outer ends of the cylinders, crank shafts mounted in the crank cases, gear wheels carried by the crank shafts, gear racks engaged by the gear wheels and mounted on the fixed portion of the engine, a hollow shaft carrying the port block and journaled in the fixed portion of the engine, and breather tubes interconnected with the crank cases and with the hollow shaft.

15. An explosion engine having a fixed portion, a rotor mounted thereon and comprising a port block, a plurality of power cylinders carried by said block in radial relation thereto, intake and outlet ports mounted on the fixed part of the engine and placed in communication with the power cylinders in four cycle order by the rotative movement of the port block and cylinders carried thereby, crank cases carried by the outer ends of the cylinders, crank shafts mounted in the crank cases, gear wheels carried by the crank shafts, gear racks engaged by the gear wheels and mounted on the fixed portion of the engine, a hollow shaft carrying the port block and journaled in the fixed portion of the engine, breather tubes interconnected with the crank cases and with the hollow shaft, and a band connecting the outer ends of the crank cases together and utilizable as a power transmitting means for the engine.

16. An explosion engine comprising spaced supporting frame structures, sub-frame members carried by the frame structures, gear racks mounted on the peripheral portions of the sub-frame members, a shaft mounted in said sub-frame members, a port block carried by the shaft, power cylinders carried by the port block in radial relation thereto, the said port block being provided with passages extending to opposite ends thereof and communicating with the cylinders individually, terminal port members for the port block and secured to the latter, port rings mounted in the sub-frames in encircling relation to the terminal members of the port block, one port ring having means for communication with a source of fuel supply and the other port ring provided with an exhaust port, a crank case for each cylinder carried by the outer end thereof, a crank shaft for each crank case, gear wheels carried by the crank shaft exterior to the crank case and in engagement with the gear racks, breather tubes interconnecting the crank cases and the interior of the shaft, a band connecting the outer ends of the crank cases together, igniting means for each cylinder, and a timer mechanism for rendering the igniting means active at a predetermined point in the rotative movement of the engine.

17. An explosion engine comprising spaced supporting frame structures, sub-frame members carried by the frame structures, gear racks mounted on the peripheral portions of the sub-frame members, a shaft mounted on said sub-frame members, a port block carried by the shaft, power cylinders carried by the port block in radial relation thereto, the said port block being provided with passages extending to opposite ends thereof and communicating with the cylinders individually, terminal port members for the port block and secured to the latter, port rings mounted in the sub-frames in encircling relation to the terminal members of the port block, one port ring having means for communication with a source of fuel supply and the other port ring provided with an exhaust port, a crank case for each cylinder carried by the outer end thereof, a crank shaft for each crank case, gear wheels carried by the crank shaft exterior to the crank case and in engagement with the gear racks, breather tubes interconnecting the crank cases and the interior of the shaft, a band connecting the outer ends of the crank cases together, igniting means for each cylinder, a timer mechanism for rendering the igniting means active at a predetermined point in the rotative movement of the engine, and a governor responsive to a predetermined speed of rotation of the engine, said governor controlling the timer mechanism and also provided with a throttle actuating means for controlling the quantity of inflow of fuel to the engine.

18. In an explosion engine, a rotatable series of power cylinders and means for controlling said cylinders in four cycle order comprising a port block rotatable with the cylinders and having inlet and exhaust passages for each cylinder and separate relatively fixed members one provided with an inlet port and the other with an exhaust port for the engine, said members having their ports in position to communicate with the passages to the cylinders on the rotative movement of the port block in four cycle order.

19. In an explosion engine, a rotatable series of power cylinders and controlling means therefor comprising a port block rotatable with the cylinders, said port block having passages therethrough individual to the cylinders, end members for the port block each comprising a ring with passages therethrough communicating with the passages in the port block and with radial circular spaced flanges and also having packing members on opposite sides of the outlets of the passages, and a port ring for each terminal member of the port block having interior grooves for the reception of the flanges on said terminal members and provided with a port into matching relation with which the passages in the respective terminal member of the port block are movable in succession.

20. In an explosion engine, a rotatable series of power cylinders and controlling means therefor comprising a port block rotatable with the cylinders, said port block having passages therethrough individual to the cylinders, end members for the port block each comprising a ring with passages therethrough communicating with the passages in the port block and with radial circular spaced flanges and also having packing members on opposite sides of the ports of the passages, a port ring for each terminal member of the port block having interior grooves for the reception of the flanges on said terminal members and provided with a port into matching relation with which the passages in the respective terminal member of the port block are movable in succession, said port ring having means for holding it in different ports of rotative adjustment, and means for imparting rotative movement to the port ring at will.

21. In an explosion engine, a rotatable series of power cylinders and means for supplying fuel to the cylinders and exhausting the burnt gases in four cycle order comprising a port block with terminal members, said block and terminal members having passages therethrough individual to and communicating with the respective cylinders, said passages terminating at the peripheral portions of the terminal members, and relatively fixed port rings surrounding said terminal members and each provided with a port into matching relation with which the passages through the periphery of the respective terminal member of the port block are movable in succession by the rotative movement of the port block.

22. In an explosion engine, a rotatable series of power cylinders and means for supplying fuel to the cylinders and exhausting the burnt gases in four cycle order comprising a port block with terminal members, said block and terminal members having passages therethrough individual to and communicating with the respective cylinders, said passages terminating at the peripheral portions of the terminal members, relatively fixed port rings surrounding said terminal members and each provided with a port into matching relation with which the passages through the periphery of the respective terminal member of the port block are movable in succession by the rotative movement of the port block, said port ring having a circular series of recesses, locking means movable into and out of the recesses at will, and means for imparting rotative movement to the port ring at will comprising a gear member on the port ring, a pinion in engagement with said gear member and accessible means for rotating said pinion at will.

23. In an explosion engine, a rotatable series of radially disposed power cylinders, a port block carrying said cylinders and rotatable with them, the port block having ports or passages individual to and communicating with the cylinders, and separate relatively stationary members having ports or passages therethrough for the flow of fuel and the escape of burnt gases, the port block by its rotative movement carrying the ports therein into successive matching relation to the ports in the relatively fixed port members to establish four cycle conditions in the power cylinders.

24. In an explosion engine, a rotor provided with power cylinders and a port block carrying said cylinders and provided with ports or passages individual to said cylinders, said port block having terminal members with spaced peripheral flanges and the passages through the port block opening through the periphery of the terminal members between the flanges, and port rings embracing the flanged edges of the terminal members of the port block and provided with grooves receiving said flanges, said port rings being each provided with a port into which the peripheral ports of the terminal members are movable successively and said rings also being divided for application to the flanged terminal members.

25. In an explosion engine, a rotatable series of power cylinders, a port block carrying said cylinders and provided with passages or ports individual to said cylinders, port members each having a single port in matching relation to which the respective ports or passages in the port block are brought successively by the rotative movement of the port block, and means for the rotative movement of the relatively fixed port members to vary the relation thereof to the rotatable port block to correspondingly vary the cycle of operations for causing rotation in one direction or the other at will.

26. In an explosion engine, a rotatable series of power cylinders, a port block carrying said cylinders, a shaft carrying the port block, a supporting frame in which the shaft is journaled, relatively fixed separate port members carried by the supporting frame and with relation to which the port member is rotatable for bringing its ports successively into matching relation to the ports of the respective port members to establish four cycle conditions within the power cylinders, and means controlled by the power cylinders for causing rotative movement of said cylinders and port block.

27. In an explosion engine, a hollow shaft, a circular series of radially disposed power cylinders carried by said shaft, crank cases carried by the cylinders, breather tubes interconnected with the crank cases and with the hollow shaft, and means for introducing lubricant into said hollow shaft.

28. In an explosion engine provided with a frame structure having opposed sub-frame members in spaced relation one to the other and each formed with a peripheral overhanging flange, a circular gear rack mounted on the exterior of said overhanging flange, port rings carried by the sub-frame members interior to the flanges thereof, each of said port rings having a port therethrough, a shaft mounted on said sub-frame members concentric with the port rings and with the overhanging flanges, a port block on said shaft having terminal members within the port rings, the port blocks and terminal members having passages therethrough opening at the peripheries of the terminal members in position to be brought successively into matching relation to the ports of the port rings, power cylinders mounted on the port block and communicating with the passages in the port block, pistons carried by the power cylinders, and connections between the pistons and the gear racks, said connections including gear wheels engaging said gear racks for imparting rotative movement to the cylinders by the reciprocatory movement of the pistons.

29. An explosion engine provided with a frame structure having opposed sub-frame members in spaced relation one to the other and each formed with a peripheral overhanging flange, a circular gear rack mounted on the exterior of said overhanging flange, port rings carried by the sub-frame members interior to the flanges thereof, each of said port rings having a port therethrough, a shaft mounted on said sub-frame members concentric with the port rings and with the overhanging flanges, a port block in said shaft having terminal members within the port rings, the port blocks and terminal members having passages therethrough opening at the peripheries of the terminal members in position to be brought successively into matching relation to the ports in the port rings, power cylinders mounted on the port block and communicating with the passages in the port block, crank cases carried by the cylinders, crank shafts mounted in the crank cases and connected to the pistons, gear wheels carried by the crank shafts in engagement with the racks on the sub-frames, and a band connecting the crank cases together at their outer ends.

30. An explosion engine provided with a frame structure having opposed sub-frame members in spaced relation one to the other and each formed with a peripheral overhanging flange, a circular gear rack mounted on the exterior of said overhanging flange, port rings carried by the sub-frame members interior to the flanges thereof, each of said port rings having a port therethrough, a shaft mounted on said sub-frame members concentric with the port rings and with the overhanging flanges, a port block in said shaft having terminal members within the port rings, the port blocks and terminal members having passages therethrough opening at the peripheries of the terminal members in position to be brought successively into matching relation to the ports in the port rings, power cylinders mounted on the port block and communicating with the passages in the port block, crank cases carried by the cylinders, crank shafts mounted in the crank cases and connected to the pistons, gear wheels carried by the crank shafts in engagement with the racks on the sub-frames, a band connecting the crank cases together at their outer ends, and breather tubes connecting the crank cases and the interior of the shaft, the latter being hollow and provided with means for the introduction of lubricant into said shaft.

In testimony, that I claim the foregoing as my own, I have hereto affixed my signature in the presence of two witnesses.

ALBERT E. YOUNGREN.

Witnesses:
ELIZABETH J. CHANDLER,
BLANCHE HILL.